United States Patent [19]

Smith

[11] Patent Number: 4,985,669

[45] Date of Patent: Jan. 15, 1991

[54] MOTOR FEEDBACK SYSTEM

[75] Inventor: Robert C. B. Smith, Rocky Hill, Conn.

[73] Assignee: Tri-Tech Inc., Waterbury, Conn.

[21] Appl. No.: 379,546

[22] Filed: Jul. 13, 1989

[51] Int. Cl.$^5$ ............................................. H02P 8/00
[52] U.S. Cl. ................................. 318/685; 318/254; 310/49 R
[58] Field of Search ............... 318/138, 254, 439, 685, 318/696; 310/49 R, 49 A

[56] References Cited

U.S. PATENT DOCUMENTS

| | | | |
|---|---|---|---|
| 3,586,942 | 6/1971 | McMahan | 318/439 X |
| 3,594,624 | 7/1971 | Lueder | 318/439 X |
| 3,671,841 | 6/1972 | Hoffman . | |
| 4,131,828 | 12/1978 | Houshi | 318/138 |
| 4,241,270 | 12/1980 | Haydon et al. . | |
| 4,274,026 | 6/1981 | Haydon et al. . | |
| 4,311,933 | 1/1982 | Riggs et al. | 318/138 X |
| 4,396,875 | 8/1983 | Yamauchi | 318/254 |
| 4,398,134 | 8/1983 | Muller | 318/254 |
| 4,403,174 | 9/1983 | Miyazaki et al. | 318/254 |
| 4,584,505 | 4/1986 | Chung et al. | 318/254 |
| 4,639,648 | 1/1987 | Sakamoto | 318/254 |
| 4,672,274 | 6/1987 | Suganuma | 318/254 |
| 4,714,853 | 12/1987 | Palmero et al. . | |
| 4,841,189 | 6/1989 | Cooper et al. | 310/257 |

Primary Examiner—Bentsu Ro
Attorney, Agent, or Firm—Curtis, Morris & Safford

[57] ABSTRACT

A multi-phase stepper motor in which one or more salient sensor poles and corresponding pick-up windings are employed to sense the actual position of the rotor. The rotor is of annular configuration and includes a first set of nonsalient rotor poles around its outer periphery and a second set of nonsalient rotor poles around its inner periphery, with the outer rotor poles being in magnetic flux relationship with the motor's stator poles and the inner rotor poles being in magnetic flux relationship with the sensor poles. A cylindrical housing of magnetic material surrounds the motor. An energizing circuit is provided to apply successive direct current pulses to the stator windings of the motor, and the pick-up windings are connected in a feedback circuit to adjust the applied pulses in accordance with the desired position of the rotor.

16 Claims, 4 Drawing Sheets

FIG. 1

FIG. 2
VIEW 2-2

FIG. 3
VIEW 3-3

MOTOR FEEDBACK SYSTEM

BACKGROUND OF THE INVENTION

This invention relates to electric rotating machines and more particularly to stepper motors operable with a single-phase or multi-phase current supply.

There has been developed a line of fractional horse power electric motors that are extremely responsive to the incoming signals and highly efficient. Representative motors of this type are disclosed, for example, in Albert Palmero and Charles Hansen U.S. Pat. No. 4,714,853, Arthur W. Haydon and John J. Dean U.S. Pat. Nos. 4,241,270 and 4,274,026, Arthur W. Haydon U.S. Pat. No. 3,671,841, Gotfred O. Hoffmann U.S. Pat. No. 3,671,841 and Roy Copper and Charles Hansen co-pending U.S. Pat. applications Nos. 121,170 and 312,765. The motors customarily are of cylindrical configuration and utilize a nonsalient pole rotor with salient stator poles in magnetic flux relationship with the rotor poles. The stator poles are energized by one or more windings supplied with single phase or multi-phase current and in many cases may be operated as stepper motors in which the rotor moves in discrete rotational increments or steps.

For several applications of such motors it is desirable to maintain a constant rotor velocity and to insure that the rotor is oriented in its proper angular position at all times. Many prior motors have exhibited deficiencies in these respects, and such deficiencies have been of special moment in cases in which the rotors of the motors where subjected to varying loads. As the load increases, for example, the motor tends to lose synchronization with the resulting adverse effect on the motor's velocity and rotor position. To alleviate these difficulties it was often necessary heretofore to over-design the motors and to operate such motors at substantially less than their rated torque capability to provide a safe margin. As a result, the motors were unnecessarily expensive to manufacture and had other disadvantages.

SUMMARY

One general object of this invention, therefore, is to provide a new and improved electric motor or other electric rotating machine.

More specifically, it is an object of this invention to provide a machine of the character indicated in which the rotor of the machine operates in discrete increments or steps.

Another object of the invention is to provide such a stepper motor in which the rotor is maintained in its proper angular position at all times.

A further object of this invention is to provide an electric motor in which the speed of the rotor remains constant in response to varying applied loads.

A still further object of this invention is to provide a multi-phase electric motor with a simplified and efficient stator structure.

Still another object of the invention is to provide an electric rotating machine having comparatively simple mechanical and electrical components which is economical to manufacture and thoroughly reliable in operation.

In one illustrative embodiment of the invention, the machine includes an annular rotor having a first set of nonsalient rotor poles around its outer periphery and a second set of nonsalient rotor poles around inner periphery. A cylindrical housing of magnetic material surrounds the rotor in spaced coaxial relationship therewith, and at least one stator phase assembly is connected to the housing. The stator phase assembly has a plurality of salient stator poles in magnetic flux relationship with one of the outer and inner sets of rotor poles and is provided with an annular winding for energizing the stator poles. The winding is connected to an energizing circuit which applies successive pulses to the winding to operate the rotor in discrete increments of rotation.

In accordance with one feature of the invention, there is provided a pick-up unit which includes at least one salient sensor pole in magnetic flux relationship with the other set of outer and inner rotor poles. A pick-up winding cooperates with the sensor pole to accurately sense the position of the rotor during the rotor's stepping movement.

In accordance with another feature of the invention, in certain advantageous embodiments, a feedback circuit interconnects the pick-up winding and the energizing circuit to adjust the pulses applied to the stator winding in accordance with the desired position of the rotor. The arrangement is such that the rotor is maintained in its proper position throughout its stepping movement.

In accordance with a further feature of some embodiments of the invention, the energizing circuit serves to maintain the rotor speed constant and in synchronism in response to varying loads applied thereto.

The foregoing and other objects, features, and advantages of the invention will be more readily understood from the following description of certain preferred embodiments, when read with reference to the accompanying drawings.

DESCRIPTION OF CERTAIN PREFERRED EMBODIMENTS

Figure 1:
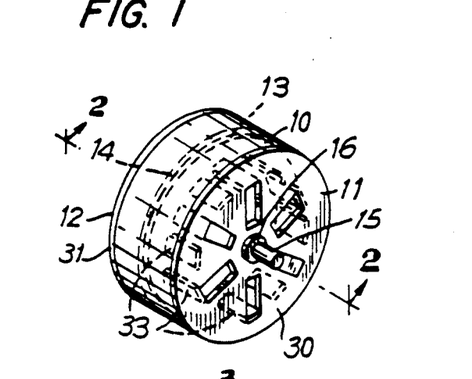
FIG. 1 is a perspective view of a two-phase stepper motor in accordance with one illustrative embodiment of the invention.
Figure 2:
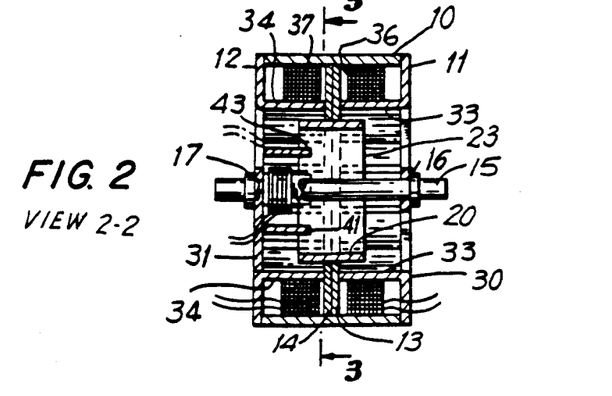
FIG. 2 is a sectional view taken along the line 2—2 in FIG. 1.
Figure 3:
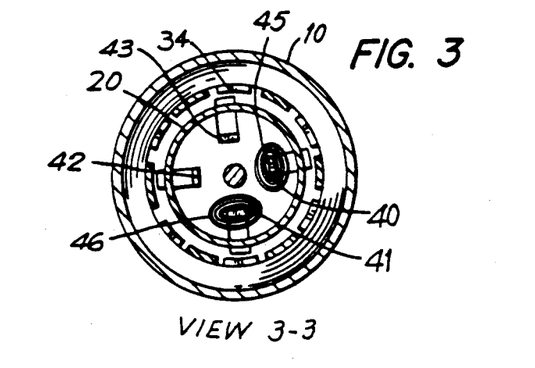
FIG. 3 is a sectional view taken along the line 3—3 in FIG. 2.

Referring to FIGS. 1-3 of the drawings, there is shown an electric motor in accordance with a preferred embodiment of the invention. Although the motor is of general application, it is particularly well suited for use as a stepper motor, that is, an electrical rotating machine in which the rotor of the machine runs in discrete increments or steps.

The motor includes a cylindrical housing 10, two end plates 11 and 12 and two intermediate plates 13 and 14. Both the housing 10 and the plates 11, 12, 13 and 14 are of magnetic material, such as cold rolled steel, which has high permeability so as to form low reluctance magnetic flux paths. An output shaft 15 protrudes from the end plates 11 and 12 through appropriate bearings 16 and 17. The output shaft 15 is customarily connected to appropriate speed reduction gears (not shown) to provide the desired output.

The housing 10 surrounds an annular rotor indicated generally at 20. The rotor 20 comprises a comparatively long thin cylinder of ceramic magnetic material which is appropriately permanently magnetized to provide nonsalient rotor poles. A relatively "hard" material is used so as to have high coercivity, low permeability, a low specific gravity and a high magnetic energy product. For best results, the magnetic energy product of the rotor material should be at least about $3.0 \times 10^6$ gauss-oersteds along the axis of magnetic orientation. Representative examples of such materials are Ceramagnet A, A19 and A70 manufactured by Stackpole Carbon Company, Electronic Components Division, St Marys, Pa., and Indox I and Indox V manufactured by Indiana General Corporation, Valparaiso, Ind. They are of anisotropic barium ferrite having a composition $BaF_{12}O_{19}$. Another suitable material is Plastiform available from the Leyman Corporation, Cincinnati, Ohio. The rotor also may be fabricated from a 77% platinum, 23% cobalt material made by The Hamilton Watch Company of Lancaster, PA. This latter material has a residual induction of 6,400 gauss, a coercive force of 4300 oersteds and a maximum energy product of $9.0 \times 16^6$ gauss-oersteds.

In the embodiment illustrated in FIGS. 1-3 the rotor 20 has a length greater than its diameter. This helps to maintain a low rotational inertia for the rotor and hence improves the useful torque output. The rotational inertia of the rotor varies directly as the fourth power of its diameter, and thus a large diameter rotor will have a greater rotational inertia than a thin rotor.

A spacer wheel 23 serves to connect the rotor 20 to the output shaft 15. The wheel 23 is disposed within the rotor and is suitably secured thereto such that the rotor's angular movement is transmitted through the wheel to the output shaft.

Figures 3A, 4, 7:
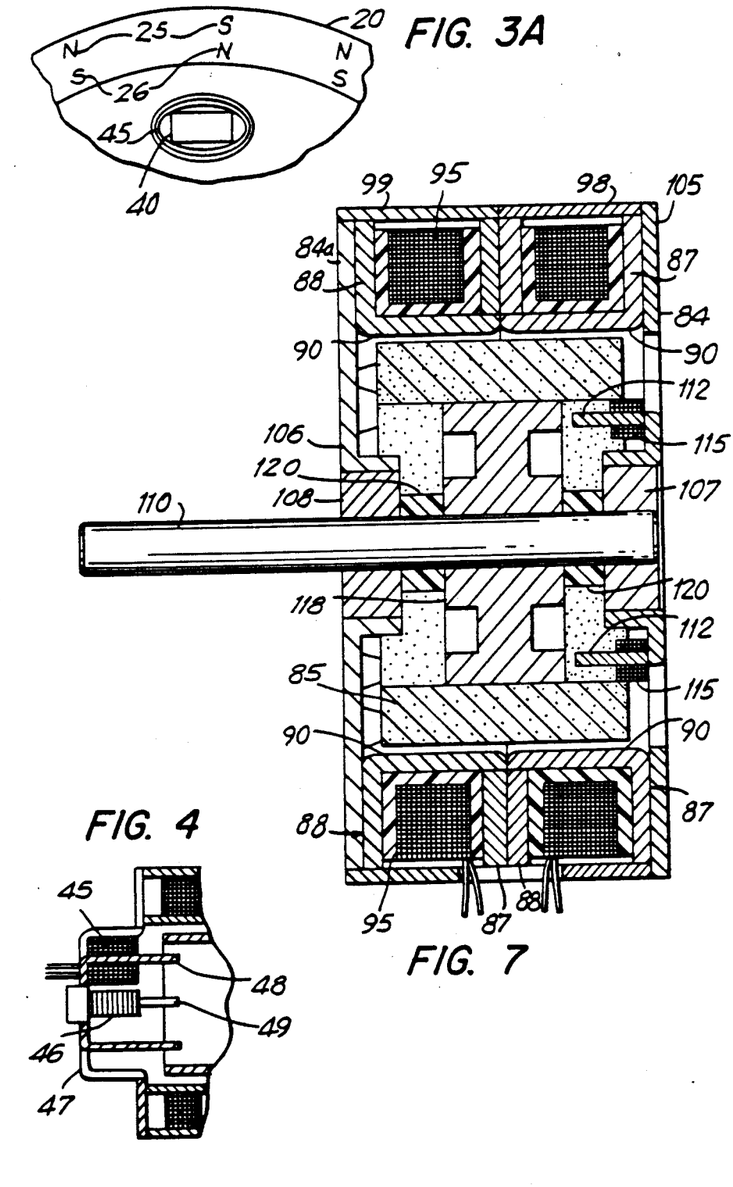
FIG. 3A is an enlarged fragmentary view of the rotor and one of the pick-up units for the motor.
FIG. 4 is a fragmentary vertical sectional view of a two-phase stepper motor in accordance with another illustrative embodiment of the invention.
FIG. 7 is a vertical sectional view of the motor of FIG. 6.

As best shown in FIG. 3A, the rotor 20 includes an outer set 25 of permanently magnetized nonsalient rotor poles and an inner set 26 of permanently magnetized nonsalient rotor poles. The poles in the set 25 alternate north (N) and south (S) around the outer periphery of the rotor, and the poles in the set 26 similarly alternate north and south around the inner periphery of the rotor. The poles in the outer and inner sets are magnetically isolated from one another, and in the illustrated embodiment each pole in the outer set is in radial alignment with a pole of opposite polarity in the inner set. In other good arrangements, however, each outer set pole may be in radial alignment with an inner set pole of the same polarity, or the poles in the respective sets may be angularly spaced from one another.

Referring again to FIGS. 1-3, the plates 11 and 13 cooperate with one another to form a stator phase assembly 30, and the plates 12 and 14 similarly cooperate with one another to form a stator phase assembly 31. The plates 11 and 13 are pierced to provide six salient stator poles 33 on each plate which extend axially in interleaved relationship with each other and in magnetic flux relationship with the outer set 25 of rotor poles adjacent one end of the rotor 20. The plates 12 and 14 likewise are pierced to provide six salient stator poles 34 on each plate which again extend axially in interleaved relationship with each other and in magnetic flux relationship with the outer set 25 of rotor poles adjacent the opposite end of the rotor.

The salient stator poles 33 and 34 are respectively energized by field windings 36 and 37. The windings 36 and 37 are located in the spaces between the plates 11 and 13 and the plates 12 and 14, respectively, and are supplied through appropriate lead wires with current pulses which differ in phase by ninety electrical degrees.

As best seen in FIGS. 2 and 3, the rear end plate 12 is pierced to provide four salient sensor poles 40, 41, 42 and 43. The sensor poles 40, 41, 42 and 43 extend into the adjacent end of the rotor 20 and are located in magnetic flux relationship with the inner set 26 (FIG. 3A) of rotor poles. The sensor poles are equally spaced around the inner periphery of the rotor at ninety electrical degree intervals, and the poles 40 and 41 are provided with pick-up windings 45 and 46, respectively. The sensor poles 40 and 42 and the sensor poles 41 and 43 each comprise a set of poles, and the pole sets are phase shifted by 180 electrical degrees, for example. In the illustrated embodiment a pick-up winding is provided on only one sensor pole in each set, but in other embodiments pick-up windings may be placed on both poles and connected together to increase the strength of the signals induced in the windings by the inner rotor poles. In a manner that will become more fully apparent hereinafter, the pick-up windings continuously sense the angular position of the rotor.

FIG. 4 is illustrative of an alternative arrangement for supporting the sensor poles and pick-up windings. The motor of FIG. 4 includes a drawn pole plate 47 which is affixed to the rear end of the housing 10 and is provided with four salient sensor poles arranged in sets 48 and 49. The poles in the sets 48 and 49 are similar to the poles 40, 41, 42 and 43 of FIG. 2 but are elongated with their inner ends in magnetic flux relationship with the inner set of rotor poles. The windings 45 and 46 are associated with the sets 48 and 49, respectively, in a manner similar to that described heretofore.

Figure 5:
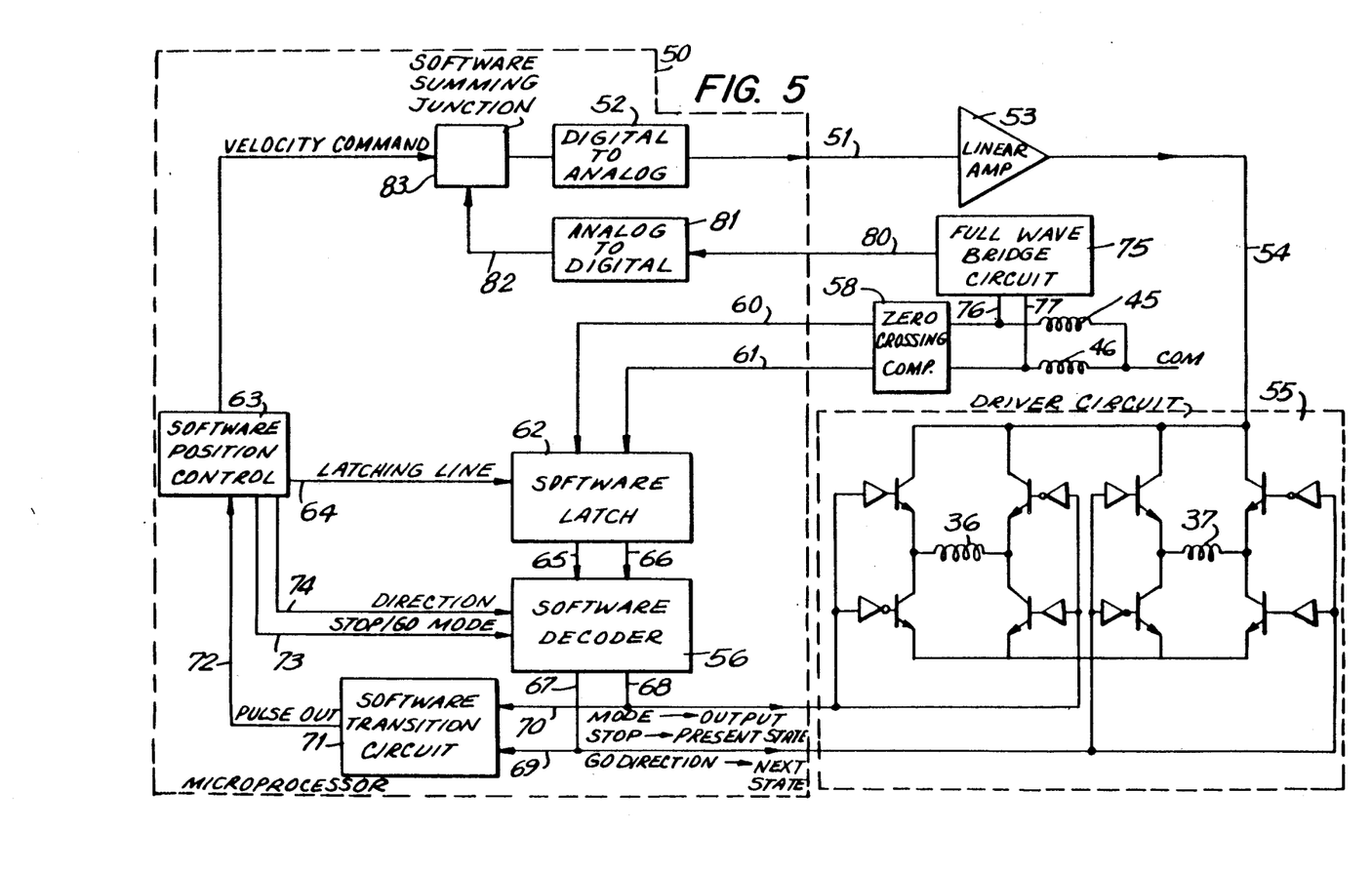
FIG. 5 is a schematic diagram of an electrical circuit for the motor illustrated in FIG. 1.

Referring now to FIG. 5, there is shown a schematic diagram of the energizing and feedback circuits for the motor. The energizing circuit includes a microprocessor 50 of conventional construction which supplies successive digital voltage signals to an output lead 51. These signals are converted to analog form by a digital-to-analog converter 52, are amplified by an amplifier 53 and are then applied over a lead 54 to the energizing windings 36 and 37 of the motor. The energizing windings are connected in a dual full-wave bridge driver circuit 55 and are activated in a predetermined sequence determined by a software decoder 56 to operate the rotor of the motor in discrete increments of rotation.

Feedback signals from the pick-up windings 45 and 46 are transmitted to a zero crossing comparator circuit 58. The circuit 58 produces square wave output signals having the same polarity as the incoming signals, and these output signals are transmitted over leads 60 and 61 to a software latch circuit 62 in the microprocessor 50. Latch signals from a software position control circuit 63 within the microprocessor are transmitted over a lead 64 to the latch circuit 62, and upon a valid transition of the input lines to the latch the valid feedback signals are applied over leads 65 and 66 to the software decoder 56. Depending on the selected mode of operation, the decoder 56 initiates the next rotor increment or maintains the present step. In the "stop mode" a step will not be initiated, while in the "go mode" the next step will begin in the direction selected by the position control circuit 63. The "stop mode" and "go mode" signals are applied to the decoder 56 over a lead 73 from the software position control circuit 63, while a lead 74 applies signals to the decoder from the control circuit in accordance with the desired direction for rotation of the rotor.

The feedback signals are transmitted from the decoder 56 over leads 67 and 68 to respective leads 69 and 70 which are connected between the driver circuit 55 and a software transition circuit 71 in the microprocessor. The circuit 71 produces output pulses which are fed over a lead 72 to the position control circuit 63. Upon a transition of the software decoder output the transition circuit 71 sends a pulse to the position control circuit 63 to keep track of the number of step increments the rotor has been commanded to move.

Feedback signals from the pick-up windings 45 and 46 also are transmitted to a full-wave bridge circuit 75 over leads 76 and 77. The bridge circuit 75 produces an analog voltage output representative of the instantaneous velocity of the rotor, and this output is transmitted over a lead 80 to an analog-to-digital converter 81 and then over a lead 82 to a software summing junction 83 within the microprocessor 50. The summing junction 83 subtracts the actual rotor velocity as represented by the converter output from the velocity command signals to produce an error signal. An increase in the error signal is amplified by the amplifier 53 to increase the voltage applied across the stator windings 36 and 37 and thereby produce more torque to bring the rotor up to speed. Conversely, the applied voltage decreases as the rotor approaches the command speed.

During the stepping movement of the rotor 20 in response to energization of the stator windings 36 and 37, the nonsalient rotor poles in the inner set 26 (FIG. 3A) move in succession past the sensor poles 40, 41, 42 and 43. Voltage signals are thereby induced in the pickup windings 45 and 46, and these signals are accurately representative of the instantaneous position of the rotor. The induced signals are fed through the latch circuit 6 and the decoder 56 to provide the necessary commutating signals for the stator windings 36 and 37. The position control circuit 63 counts the rotor step increments and controls the command velocity. When the rotor reaches the next desired stopping position the circuit 63 actuates the decoder to the "stop mode" to hold the rotor stationary. While in the "stop mode", the circuit 63 applies a signal to the output lead 51 to maintain holding torque on the motor.

Figure 6:
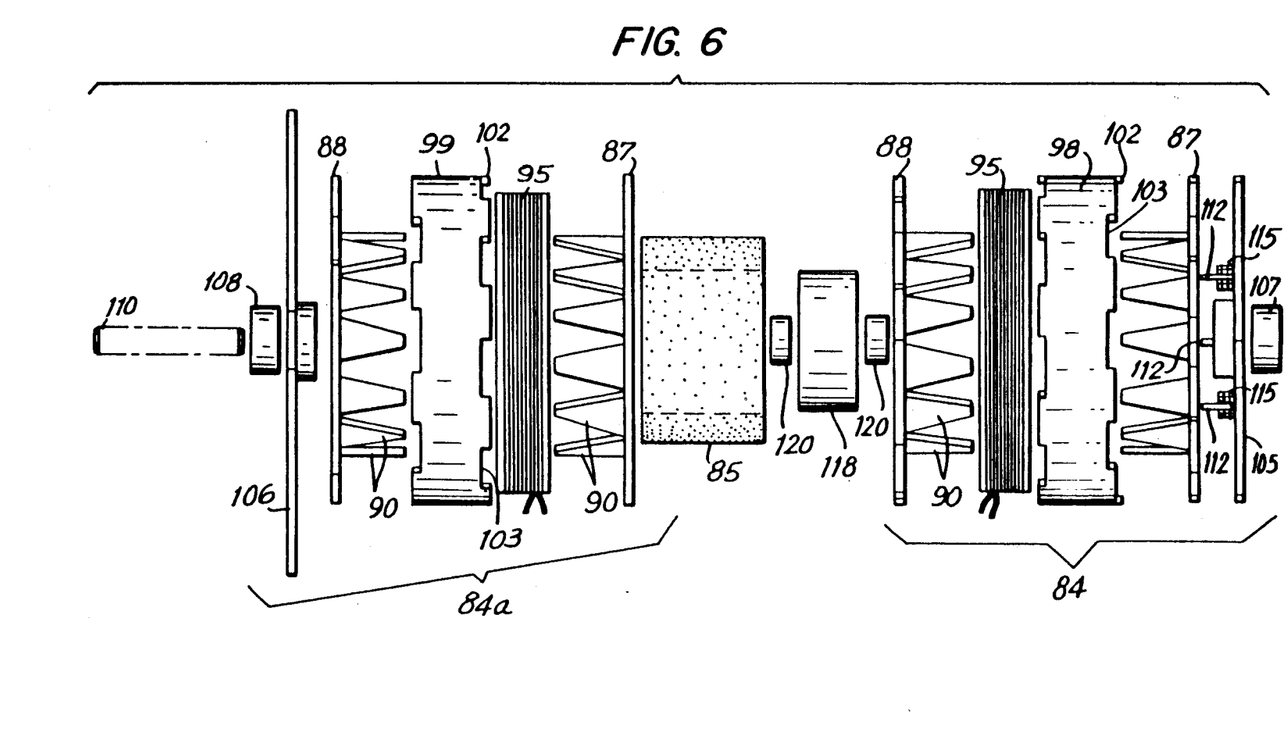
FIG. 6 is an exploded perspective view of a two-phase stepper motor in accordance with a further illustrative embodiment of the invention.

The motor illustrated in FIGS. 6 and 7 is similar in several respects to that shown in co-pending U.S. Pat. applications Nos. 121,170 and 312,765 referred to heretofore but has been modified in accordance with the present invention. As more fully described in these co-pending applications, the motor includes two stator phase assemblies 84 and 84a which are concentrically disposed around the outer periphery of an annular permanent magnet rotor 85. Each of the stator phase assemblies 84 and 84a includes a pair of cup-shaped stator pole pieces 87 and 88 of annular configuration. Extending axially from each of the pole pieces 87 and 88 are twelve integrally formed stator teeth or salient poles 90. The teeth 90 on the pole piece 87 are interleaved with the teeth 90 on the pole piece 88 with the spaces between the teeth forming V-shaped notches. In the assembled condition of the motor each of the stator teeth is in magnetic flux relationship with the nonsalient magnetic poles on the outer periphery of the rotor.

Each pair of pole pieces 87 and 88 forms an annular space therebetween which receives an energizing winding 95. The winding 95 for the uppermost pole pieces 87 and 88, as viewed in FIG. 6, is supplied with single phase current pulses to magnetize the stator teeth 90 on the pole piece 87 with one polarity and the stator teeth 90 on the pole piece 88 with the opposite polarity. The winding 95 for the lowermost pole pieces 87 and 88 also is supplied with single phase current pulses to similarly magnetize the corresponding stator teeth, but these latter pulses differ in phase from the pulses applied to the uppermost winding by ninety electrical degrees.

The stator phase assemblies 84 and 84a are provided with field rings 98 and 99, respectively. Each of the field rings 98 and 99 includes a plurality of projections 102 and recesses 103 along its peripheral side edges such that when the motor is assembled the projections 102 on the side edge of one field ring will frictionally interlock within the recesses 103 on the side edge of an adjacent field ring. With this arrangement, each stator phase assembly may be of a different phase, and two, three or more phases may be attained within a given motor.

A rear mounting plate 105 is in facing contact with the uppermost pole piece 87, and a front mounting plate 106 is in facing contact with the lowermost pole piece 88. The mounting plates 105 and 106 are respectively provided with suitable bearings 107 and 108 which accommodate a rotor output shaft 110.

Extending inwardly from the rear mounting plate 105 are four sensor poles 112. The plate 105 is suitably pierced to form the sensor poles 112, and each sensor pole is provided with a pick-up winding 115. In a manner similar to that described heretofore and illustrated in FIG. 3A, the annular rotor 85 includes an outer set of permanently magnetized nonsalient rotor poles and an inner set of permanently magnetized nonsalient rotor poles. The outer rotor poles are in magnetic flux relationship with the salient stator poles 90, while the inner set of rotor poles are in magnetic flux relationship with the sensor poles 112. The rotor 85 is secured to the output shaft 110 by a spacer wheel 118 and bearing bosses 120.

The stator windings 95 and the pick-up windings 115 are connected in an electrical circuit similar to that illustrated in FIG. 5. The circuit applies successive direct current pulses to the windings 95 to energize the windings in a ninety degree phase relationship and thereby operate the rotor in discrete increments of rotation. As the rotor turns and each nonsalient rotor pole in the inner set moves past one of the sensor poles 112, a voltage pulse is induced in the corresponding pick-up winding 115 and is fed back to the microprocessor 50. The sensor poles 112 are spaced apart by ninety electrical degrees, and the pulses fed back from the corresponding windings are accurately representative of the instantaneous position of the rotor. In a manner similar to that described above, the microprocessor compares these pulses with signals representative of the desired rotor position and adjusts the pulses applied to the stator windings to bring the rotor to the desired position.

Although the invention has been described as having particular utility for multi-phase stepper motors, it also may be employed with single phase motors or other electrical rotating machines. In some cases only a single sensor pole and pick-up winding are utilized to sense the actual rotor position once during each revolution. The machine may be operated either in the full-step or the micro-step mode, with unipolar or bipolar windings, with either a current controlled or voltage controlled driver circuit, etc. Various other modifications will become apparent to those skilled in the art upon a perusal of the foregoing specification.

The terms and expressions which have been employed are used as terms of description and not of limitation, and there is no intention in the use of such terms or expressions of excluding any equivalents of the features shown and described or portions thereof. Although illustrative embodiments of the invention have been described with reference to the accompanying drawings, it is to be understood that various changes and modifications can be made without departing from the scope or spirit of the invention.

What is claimed is:

1. An electrical rotating machine comprising, in combination:
    an annular rotor including a first set of rotor poles around its outer peripheral surface and a second set of rotor poles around its inner peripheral surface;
    a housing member surrounding the annular rotor in spaced relationship therewith;
    at least one stator phase assembly connected to the housing member and annularly disposed around said rotor, the stator phase assembly having a plurality of salient stator poles in magnetic flux relationship with one of the outer and inner sets of rotor poles and having annular winding means for energizing the stator poles;
    pick-up means in magnetic flux relationship with the other set of outer and inner rotor poles for sensing the position of the rotor; and
    an energizing circuit connected to the annular winding means for applying electrical signals thereto by thereby drive said rotor.

2. An electrical rotating machine as defined by claim 1, in which each stator phase assembly includes a pair of stator pole rings each having integrally formed stator teeth extending outwardly therefrom and having an interleaved relationship with each other so as to form said plurality of salient stator poles.

3. An electrical rotating machine as defined by claim 1, in which said salient stator poles are equally spaced.

4. An electrical rotating machine comprising, in combination:
    an annular rotor including a first set of rotor poles around its outer peripheral surface and a second set of rotor poles around its inner peripheral surface;
    a housing of magnetic material surrounding the annular rotor in spaced relationship therewith;
    at least one stator phase assembly connected to the housing and annularly disposed around said rotor, the stator phase assembly having a plurality of salient stator poles in magnetic flux relationship with one of the outer and inner sets of rotor poles and having annular winding means for energizing the stator poles;
    pick-up means including at least one salient sensor pole in magnetic flux relationship with the other set of outer and inner rotor poles for sensing the position of the rotor; and
    an energizing circuit connected to the annular winding means for applying successive electrical signals thereto to thereby drive said rotor.

5. An electrical rotating machine comprising, in combination:
    an annular rotor including a first set of nonsalient rotor poles around its outer peripheral surface and a second set of nonsalient rotor poles around its inner peripheral surface;
    a housing surrounding the annular rotor in spaced relationship therewith;
    at least one stator phase assembly connected to the housing and annularly disposed around said rotor, the stator phase assembly having a plurality of salient stator poles in magnetic flux relationship with one of the outer and inner sets of rotor poles and having annular winding means for energizing the stator poles;
    pick-up means including at least one salient sensor pole in magnetic flux relationship with the other set of outer and inner rotor poles and a pick-up winding cooperating with the sensor pole for sensing the position of the rotor; and
    an energizing circuit connected to the annular winding means for applying successive current pulses thereto to thereby operate the rotor.

6. An electrical rotating machine as defined by claim 5, in which the outer rotor poles are in radial alignment with the inner rotor poles.

7. An electrical rotating machine as defined by claim 5, in which the rotor has a length greater than its diameter.

8. An electrical rotating machine comprising, in combination:
    an annular rotor including a first set of nonsalient rotor poles around its outer peripheral surface and a second set of nonsalient rotor poles around its inner peripheral surface;
    a housing of magnetic material surrounding the annular rotor in spaced relationship therewith;
    at least one stator phase assembly connected to the housing and annularly disposed around said rotor, the stator phase assembly having a plurality of salient stator poles in magnetic flux relationship with one of the outer and inner sets of rotor poles and having annular winding means for energizing the stator poles;
    pick-up means including at least one salient sensor pole in magnetic flux relationship with the other set of outer and inner rotor poles and a pick-up winding cooperating with the sensor pole for sensing the position of the rotor;
    an energizing circuit connected to the annular winding means for applying electrical signals thereto to thereby drive said rotor; and
    a feedback circuit interconnecting the pick-up winding and the energizing circuit for adjusting the electrical signals applied to the annular winding means in accordance with the desired position of the rotor.

9. An electrical rotating machine as defined by claim 8, in which the energizing circuit includes means for maintaining the rotor speed constant in response to varying loads applied thereto.

10. An electrical rotating machine as defined by claim 9, in which the energizing circuit includes means for applying successive current pulses to the winding means to thereby operate the rotor in discrete increments of rotation.

11. An electrical rotating machine comprising, in combination:

an annular permanent magnet rotor including a first set of nonsalient rotor poles around its outer peripheral surface and a second set of nonsalient rotor poles around its inner peripheral surface;

a cylindrical housing of magnetic material surrounding the annular rotor in spaced coaxial relationship therewith;

at least two stator phase assemblies connected to the cylindrical housing and annularly disposed around said rotor, each of the stator phase assemblies having a plurality of salient stator poles in magnetic flux relationship with one of the outer and inner sets of rotor poles and having annular winding means for energizing the stator phase;

pick-up means including at least one salient sensor pole in magnetic flux relationship with the other set of outer and inner rotor poles and a pick-up winding cooperating with the sensor pole for sensing the position of the rotor;

an energizing circuit connected to the annular winding means for applying electrical signals thereto to thereby drive said rotor; and a feedback circuit interconnecting the pick-up winding and the energizing circuit for adjusting the signals applied to the annular winding means in accordance with the desired position of the rotor.

12. An electrical rotating machine comprising, in combination:

an annular permanent magnet rotor including a first set of nonsalient rotor poles around its outer peripheral surface and a second set of nonsalient rotor poles around its inner peripheral surface, the outer rotor poles being in radial alignment with the inner rotor poles;

a cylindrical housing of magnetic material surrounding the annular rotor in spaced coaxial relationship therewith;

at least two stator phase assemblies connected to the cylindrical housing and annularly disposed around said rotor, each of the stator phase assemblies having a plurality of salient stator poles in magnetic flux relationship with one of the outer and inner sets of the rotor poles and having annular winding means for energizing the stator poles;

pick-up means including a pair of salient sensor poles in magnetic flux relationship with the other set of outer and inner rotor poles and a pair of pick-up windings respectively cooperating with the sensor poles for sensing the position of the rotor;

an energizing circuit connected to the annular winding means for applying successive electrical signals thereto to thereby operate the rotor; and a feedback circuit interconnecting the pick-up windings and the energizing circuit for adjusting the signals applied to the annular winding means in accordance with the desired position of the rotor.

13. An electrical rotating machine comprising, in combination:

an annular permanent magnet rotor including a first set of nonsalient rotor poles around its outer peripheral surface and a second set of nonsalient rotor poles around its inner peripheral surface;

a cylindrical housing of magnetic material surrounding the annular rotor in spaced coaxial relationship therewith;

at least two stator phases assemblies connected to the cylindrical housing and annularly disposed around said rotor, each of the stator phase assemblies having a plurality of salient stator poles in magnetic relationship with the outer set of rotor poles and having annular winding means for energizing the stator poles;

pick-up means including a pair of salient sensor poles in magnetic flux relationship with the inner set of rotor poles and a pair of pick-up windings respectively cooperating with the sensor poles for sensing the position of the rotor;

an energizing circuit connected to the annular winding means for applying successive electrical signals thereto to thereby operate the rotor; and a feedback circuit interconnecting the pick-up windings and the energizing circuit for adjusting the signals applied to the annular winding means in accordance with the desired position of the rotor.

14. An electrical rotating machine comprising, in combination:

an annular permanent magnet rotor including a first set of nonsalient rotor poles around its outer peripheral surface and a second set of nonsalient rotor poles around its inner peripheral surface, the outer rotor poles being in radial alignment with the inner rotor poles;

a cylindrical housing of magnetic material surrounding the annular rotor in spaced coaxial relationship therewith;

at least two stator phases assemblies connected to the cylindrical housing and annularly disposed around said rotor, each of the stator phase assemblies having a plurality of salient stator poles in magnetic relationship with the outer set of rotor poles and having annular winding means for energizing the stator poles;

pick-up means including a pair of salient sensor poles in magnetic flux relationship with the inner set of rotor poles and a pair of pick-up windings respectively cooperating with the sensor poles for sensing the position of the rotor;

an energizing circuit connected to the annular winding means for applying successive direct current pulses thereto to thereby operate the rotor in discrete increments of rotation; and a feedback circuit interconnecting the pick-up windings and the energizing circuit for adjusting the direct current pulses applied to the annular winding means in accordance with the desired position of the rotor.

15. An electrical rotating machine as defined by claim 14, in which the pick-up means includes at least four salient sensor poles in magnetic flux relationship with the inner set of rotor poles.

16. An electrical rotating machine comprising, in combination:

an annular permanent magnet rotor including a first set of nonsalient rotor poles around its outer peripheral surface and a second set of nonsalient rotor poles around its inner peripheral surface, the outer rotor poles being in radial alignment with the inner rotor poles;

a cylindrical housing of magnetic material surrounding the annular rotor in spaced coaxial relationship therewith;

at least two stator phases assemblies connected to the cylindrical housing and annularly disposed around said rotor, each of the stator phase assemblies having a plurality of salient stator poles in magnetic relationship with the outer set of rotor poles and having annular winding means for energizing the stator poles;
pick-up means including a pair of salient sensor poles in magnetic flux relationship with the inner set of rotor poles and a pair of pick-up windings respectively cooperating with the sensor poles for sensing the position of the rotor;
an energizing circuit connected to the annular winding means for applying successive direct current pulses thereto to thereby operate the rotor in discrete increments of rotation, the energizing circuit including means for maintaining the rotor speed constant in response to varying loads applied thereto; and
a feedback circuit interconnecting the pick-up windings and the energizing circuit for adjusting the direct current pulses applied to the annular winding means in accordance with the desired position of the rotor.

* * * * *

UNITED STATES PATENT AND TRADEMARK OFFICE
CERTIFICATE OF CORRECTION

PATENT NO.  : 4,985,669
DATED       : January 15, 1991
INVENTOR(S) : Robert C.B. Smith It is certified that error appears in the above-identified patent and that said Letters Patent is hereby corrected as shown below:

Claim 1, column 7, line 38, "by" should read --to--.

Signed and Sealed this

Twelfth Day of May, 1992

*Attest:*

DOUGLAS B. COMER

*Attesting Officer*　　　*Acting Commissioner of Patents and Trademarks*